United States Patent [19]

Maass

[11] Patent Number: 4,989,369

[45] Date of Patent: Feb. 5, 1991

[54] SEALING AND RETAINING STRIPS

[75] Inventor: Klaus P. Maass, Viersen, Fed. Rep. of Germany

[73] Assignee: Draftex Industries Limited, Edinburgh, United Kingdom

[21] Appl. No.: 412,897

[22] Filed: Sep. 26, 1989

[30] Foreign Application Priority Data

Sept. 30, 1988 [GB] United Kingdom .............. 8822984

[51] Int. Cl.⁵ ................................................ E06B 7/16
[52] U.S. Cl. ........................................ 49/477; 49/483; 49/488
[58] Field of Search ................... 49/477, 483, 488, 498

[56] References Cited

U.S. PATENT DOCUMENTS

| | | | |
|---|---|---|---|
| 3,178,779 | 3/1965 | Clark et al. | 49/477 |
| 3,449,864 | 6/1969 | Prost-Dame et al. | 49/477 |
| 3,837,700 | 9/1974 | Van Slyke | 49/477 X |
| 4,579,192 | 4/1986 | Mueller | 180/281 |
| 4,761,917 | 8/1988 | Knecht et al. | 49/477 |
| 4,769,947 | 9/1988 | Ogawa et al. | 49/498 X |
| 4,919,471 | 4/1990 | Setno et al. | 49/488 X |

FOREIGN PATENT DOCUMENTS

| | | |
|---|---|---|
| 8717465 | 4/1989 | Fed. Rep. of Germany . |
| 58-39519 | 9/1981 | Japan . |
| 744536 | 2/1956 | United Kingdom . |
| 905808 | 9/1962 | United Kingdom .............. 49/477 |
| 1248307 | 9/1971 | United Kingdom . |
| 1342190 | 12/1973 | United Kingdom . |

*Primary Examiner*—Gary L. Smith
*Assistant Examiner*—Jerry Redman
*Attorney, Agent, or Firm*—Leydig, Voit & Mayer

[57] ABSTRACT

A retaining and sealing strip made of plastics or rubber, is supported in a channel running along the top of the window frame carried by a conventional vehicle door. The strip defines a hollow chamber running alongside the top of the window opening which, in conjunction with a lip, forms a channel in which is located the upper edge of the window glass. A wall of the chamber is pressed into sealing engagement with window glass by inflation of the hollow chamber. The upper part of the strip defines further hollow chambers, one having a relatively stiff wall hinged by a narrow neck. When this chamber is inflated, the top of the door is retained closed because any attempt at opening it results in interference between a shoulder carried by the stiff wall and a ridge formed on a relatively hard plastics or rubber retaining profile which is rivetted or stuck to the adjacent body part. When the two chambers are at least partially evacuated, the stiff wall hinges to provide clearance for opening of the door.

11 Claims, 2 Drawing Sheets

SEALING AND RETAINING STRIPS

BACKGROUND OF THE INVENTION

The invention relates to sealing and retaining strips. More specifically, though not exclusively, it relates to strips for retaining at least part of a closure member (such as a vehicle door for example) with respect to the frame of an opening and which, in addition, perform a sealing function.

SUMMARY OF THE INVENTION

According to the invention, there is provided retaining means for retaining at least part of a closure member with respect to the frame of an opening, comprising a retaining strip made of relatively flexible material running along and attached to at least part of the edge of the closure member and defining a hollow chamber arranged so that a change in pressure therewithin alters its shape and moves a retaining member between a retaining position and a releasing position, and a retaining profile separate from but attached to the said frame and so positioned thereon that it and the retaining member when in the retaining position mechanically interfere with each other and tend to prevent removal of the closure member from the opening.

According to the invention, there is also provided retaining means for retaining in its frame at least the upper part of a vehicle door carrying in its upper part a vertically slidable window pane, comprising a strip made of plastics or rubber material running along and attached to at least the top of the door and defining a first hollow chamber having a relatively flexible wall portion and a relatively rigid wall portion, such that an increase in pressure within the hollow chamber hinges the relatively rigid portion upwardly with respect to the top of the door and a reduction in the said pressure hinges the relatively rigid portion downwardly with respect to the top of the door, and a retaining profile made of relatively hard plastics or rubber material which is separate from but secured to the upper part of the frame of the door opening so as to engage with the relatively rigid wall portion in its raised position and thus tend to prevent outward movement of the top of the door.

DESCRIPTION OF THE DRAWINGS

Sealing and retaining strips according to the invention will now be described, by way of example only, with reference to the accompanying diagrammatic drawings.

DESCRIPTION OF PREFERRED EMBODIMENTS

Figure 1:
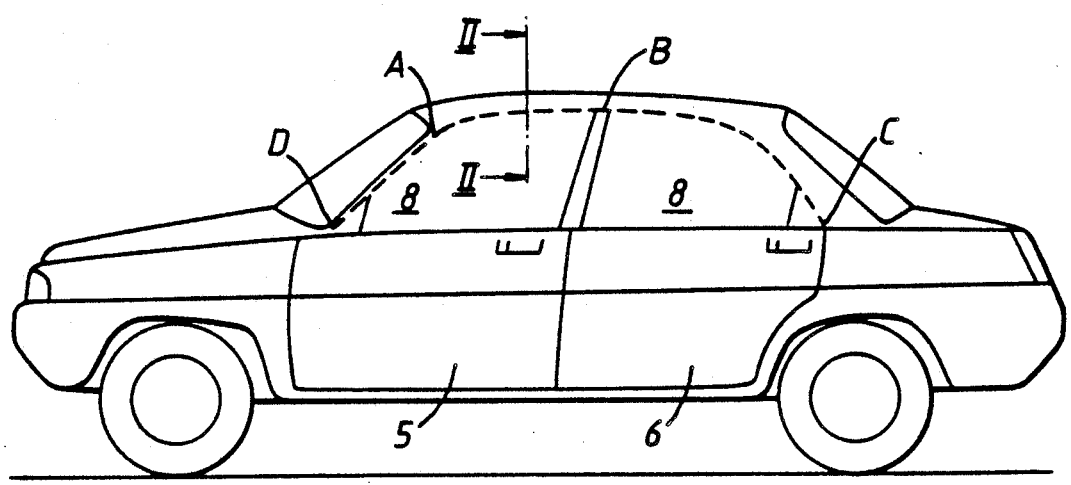
FIG. 1 is a side view of a motor vehicle body.

FIG. 1 shows one side of a motor vehicle with two doors 5 and 6. In the conventional manner, each door has a vertically slidable window pane 8 formed in its upper part, the window pane being lowerable into the hollow lower part of the door. Each door carries a frame for the window glass.

Figure 2:
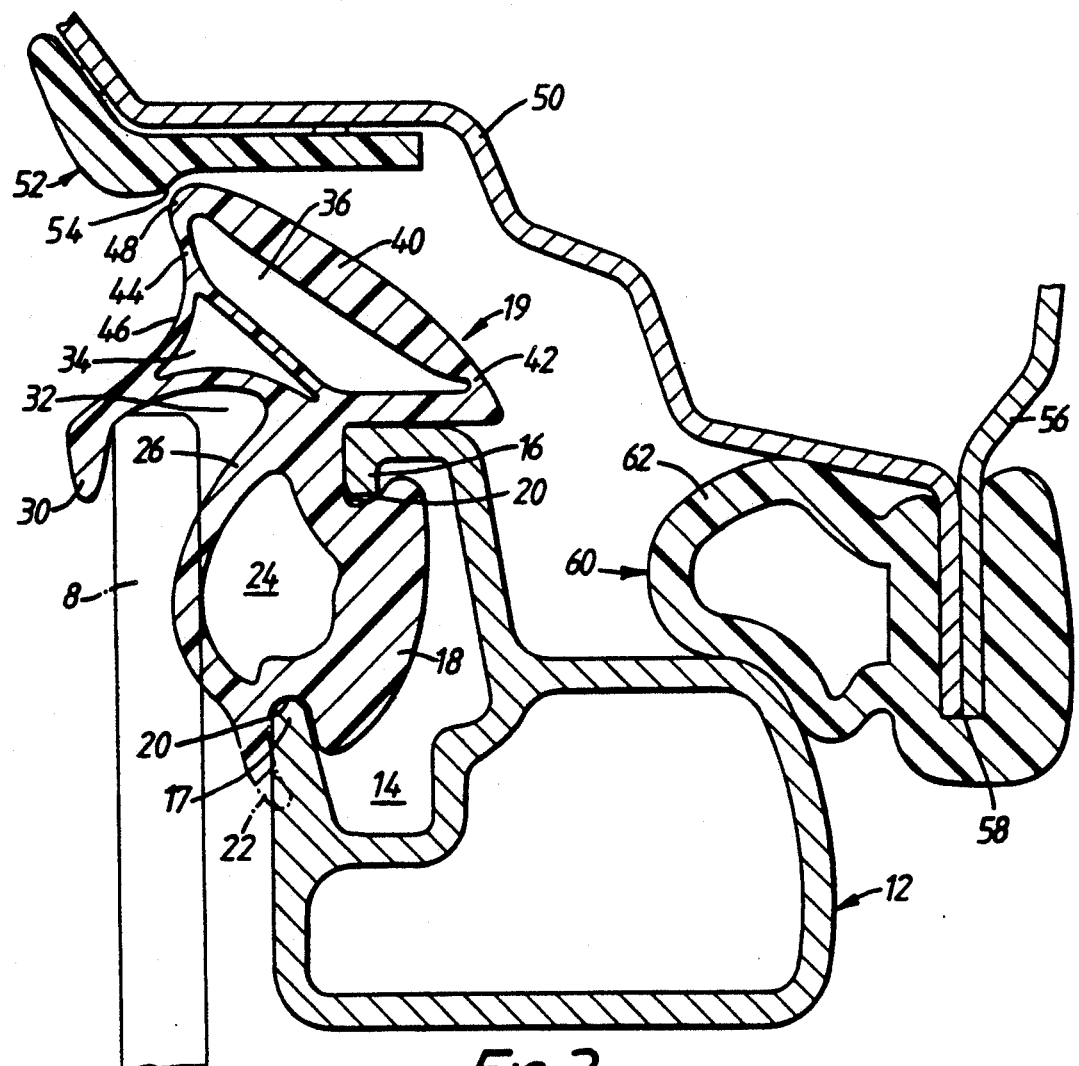
FIG. 2 is an enlarged diagrammatic cross-section taken on the line II—II of FIG. 1.

As shown in FIG. 2, the upper part 12 of the frame carried by the door 5 and in which the window glass 8 is held is, in this example, hollow and formed to provide, also, a channel 14 running along the frame 12 and with re-entrant mouth portions 16, 17. A retaining and sealing strip 19, made of plastics or rubber or similar material, is supported by the channel 14, having a head 18 and a neck 20 in which locates the re-entrant portions 16 and 17 of the channel. The strip 19 is shaped to fit sealingly along the part of the frame defining the channel 14 and carries a flexible lip 22 which is shown dotted in its relaxed position, that is, the position which it would assume if the strip 19 were removed from the door. The strip runs along at least the top of the door, that is, from point A to point B (see FIG. 1).

The strip 19 defines a hollow chamber 24 running along the length of the strip and this is closed off on the outside of the strip by a flexible wall 26 carrying flock and which bears against the window glass 8.

The upper part of the strip has a downwardly depending lip 30 which forms a channel 32 with the flexible wall portion 26 and which overlaps the outer surface of the glass 8.

Two hollow chambers 34 and 36 are defined in the upper part of the strip 19 and these, like chamber 24, extend along the full length of the strip.

The outer side of chamber 36 is defined by a relatively thick and stiff wall portion 40 connected to the remainder of the strip at its lower edge by a narrowed neck 42 and at its upper edge by relatively thin and flexible wall portions 44 and 46. The wall 40 and the flexible wall portion 44 define between them a relatively rigid shoulder 48 running along the length of the strip.

The adjacent part of the vehicle body defining the upper run of the door opening is shown at 50. A stiff retaining profile 52, made of plastics or rubber, is secured to the underside of the body part 50 such as by rivetting or adhesive and runs along the top of the door opening. The profile 52 is shaped to provide an enlarged ridge 54 running along the top of the opening.

The body part 50 meets an adjacent body part 56 to define a flange 58 and this carries a seal 60. The latter has a channel-shaped part which embracingly grips the flange 58 and a hollow softer part 62 against which the door closes to form a weather-tight seal.

Figure 3:
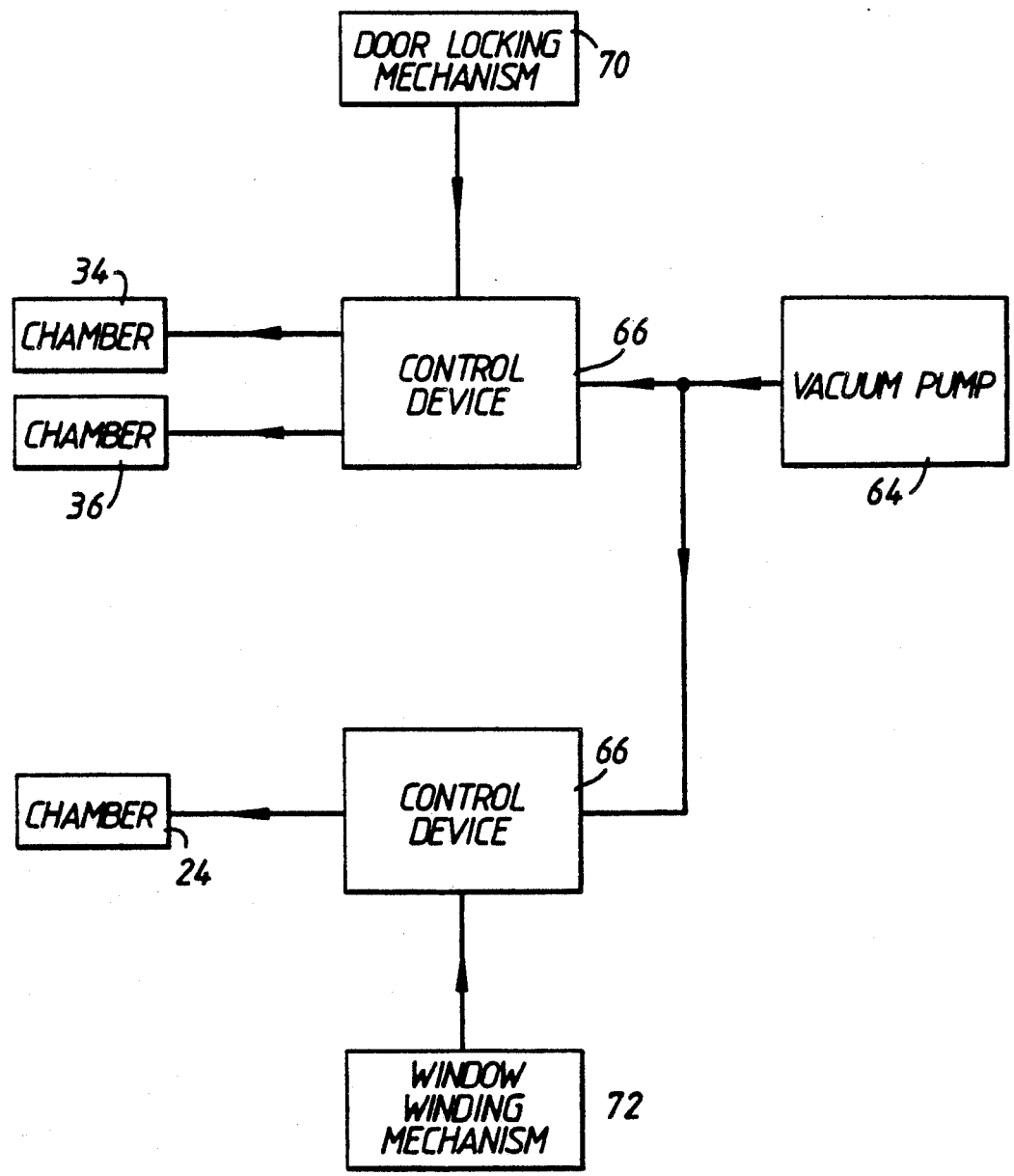
FIG. 3 which is a schematic diagram illustrating how a sealing and retaining strip embodying the invention is controlled from a vacuum pump.

Chambers 24, 34 and 36 are connected to a vacuum pump by means of which air may be evacuated from them. The pump is shown at 64 in FIG. 3 which shows the chambers 24, 34, and 36 in diagrammatic form.

As illustrated, the chambers have normal air pressure within them. The resilience of the plastics or rubber is such that the various parts of the strip 19 tend to assume the configurations shown. Therefore, in particular, the flexible wall 26 is pressed into firm sealing contact with the inside surface of the window glass 8, and the stiff wall portion 40 is held relatively rigidly in the position shown by the air pressure within the chambers 34 and 36 so that the shoulder 48 is in adjacent and interfering relationship with the ridge 54 and the profile 52.

It will therefore be apparent that any outward movement of the door relative to the vehicle body is prevented by engagement of the shoulder 48 with the ridge 54.

In addition, in this configuration of the chambers 34 and 36, the lip 30 is firmly pressed against the outside of the glass 8. Furthermore, the glass 8 is effectively sealed along its top edge by the expanded chamber 24.

When the door is to be opened, chambers 34 and 36 are at least partially evacuated by means of the vacuum pump 64 (FIG. 3) via a control device 66. The upper part of the strip 19 therefore collapses and, in particular, the stiff wall portion 40 hinges in an anti-clockwise direction, pivotting at the neck 42. Shoulder 48 therefore moves downwardly and becomes clear of the ridge 54. The door can thus be freely opened.

When the glass 8 is to be lowered, the chamber 24 is at least partially evacuated by pump 64 (FIG. 3), via a control device 68 so as to collapse the chamber 24 and to lessen the pressure of the flexible wall portion 26 against the glass.

It will be observed that the strip 19 not only retains the door against opening but also positively secures the upper edge of the window glass 8. At high speed, air pressure inside the vehicle will rise relative to the ambient pressure outside because of the ram effect driving air into the vehicle through its normal ventilating intakes. This increased air pressure has a tendency to bend the window glass (and possibly the window frame as well) outwards slightly, so tending to separate them partially from their seals and resulting in increased wind noise. The arrangement illustrated avoids this by ensuring that the top of the window glass, and the door, are positively located in the body frame. However, this positive location is not achieved at the expense of ease of opening of the door; when chambers 34 and 36 are evacuated, the door may be easily opened (and subsequently closed).

The use of the plastics or rubber retaining profile 52 is advantageous because it provides the means for retaining the door in the closed position but does not require any modification to the metalwork of the body around the door opening. Being a separate part, it can be easily designed to suit different vehicle models and enables the retaining and sealing strip 19 to be incorporated into existing designs without the need for body re-tooling.

The evacuation of chambers 34 and 36 may be integrated with the locking mechanism 70 (see FIG. 3) of the door (whether this is controlled individually or by central locking), so that release of the locking mechanism partially evacuates the chambers, thereby permitting free opening of the door. The evacuation of chamber 24 can be integrated with the window glass winding mechanism 72 (FIG. 3 also), so that operation of such mechanism causes at least partial evacuation of the chamber 24 and lessens the pressure of the wall portion 26 against the glass. The retaining action provided by the strip 19 is not intended to provide the security locking of the door but primarily to prevent loss of seal at the top part of the door at high speeds (in the manner explained) resulting in undesirable wind noise.

Although as so far disclosed, the strip 19 has been described as running along only the top of the front door, it may advantageously be extended so as to run along the top of the rear door also, possibly down to point C, and may be extended forwardly to point D. Similar strips may be applied to the other doors of the vehicle.

What is claimed is:

1. Retaining means for retaining at least part of an edge of a door with respect to the frame of an opening, the door supporting a window glass adjacent said edge, the retaining means comprising
  a retaining strip made of relatively flexible material running along and attached to at least part of said edge of the door and defining a first hollow chamber arranged so that a change in pressure therewithin alters its shape and moves a retaining member between a retaining position and a releasing position,
  the strip defining a further hollow chamber having a flexible wall portion, the further hollow chamber and its flexible wall portion being positioned adjacent the said edge of the door and thereby adjacent to the window glass supported by the door whereby the flexible wall portion moves between a sealing position in sealing engagement with the window glass and a non-sealing position out of sealing engagement with the window glass according to the pressure within the further hollow chamber.
  pressure-changing means connected to the two hollow chambers for changing the pressures therewithin so as to alter the shape of the first hollow chamber and to move the retaining member between the retaining position and the releasing position and to move the flexible wall portion of the further hollow chamber between the sealing position and the non-sealing position, and
  a retaining profile separate from but attached to the said frame and so positioned thereon that it and the retaining member when in the retaining position mechanically interfere with each other and tend to prevent removal of the door from the opening.

2. Retaining means according to clam 1, in which the strip is made of plastics or rubber material, the retaining member being an integral part of the strip and which at least partly defines the first hollow chamber.

3. Retaining means according to claim 1, in which the retaining profile is a strip of plastics or rubber material having a raised edge for interfering with the retaining member, and which is attached to the frame as by adhesive or rivetting.

4. Retaining means according to claim 1, in which the door includes a window operating mechanism for sliding the window glass and including means operationally linking the pressure-changing means with the window operating mechanism such that operation of the window operating mechanism causes the pressure-changing means to change the pressure in the further hollow chamber.

5. Retaining means for retaining at least part of an edge of a closure member with respect to the frame of an opening, comprising
  a retaining strip made of relatively flexible material running along and attached to at least part of the edge of the closure member and defining a hollow chamber arranged so that a change in pressure therewithin alters its shape and moves a retaining member between a retaining position and a releasing position,
  pressure-changing means connected to the hollow chamber for changing the pressure therewithin such as to move the retaining member between the retaining position and the releasing position,
  separate mechanical locking means for locking the closure member within the frame,
  means operationally linking the pressure-changing means with the mechanical locking means such that operation of the mechanical locking means causes the pressure-changing means to change the pressure in the hollow chamber, and a retaining profile separate from but attached to the said frame and so positioned thereon that it and the retaining member when in the retaining position mechanically interfere with each other and tend to prevent removal of the closure member from the opening.

6. Retaining means for retaining at least a top edge of a vehicle door in its frame, the vehicle door carrying in its upper part a vertically slidable window pane, comprising
a strip made of plastics or rubber material running along and attached to at least the top edge of the door and defining a first hollow chamber having a relatively flexible wall portion and a relatively rigid wall portion, such that an increase in pressure within the hollow chamber hinges the relatively rigid portion upwardly with respect to the top edge of the door to a raised position and a reduction in the said pressure hinges the relatively rigid portion downwardly with respect to the top edge of the door away from the raised position.
pressure-changing means connected to the first hollow chamber for increasing and decreasing the pressure therewithin.
a second hollow chamber defined in the plastics or rubber material and adjacent to the first hollow chamber such that a change in pressure within the second chamber supplements the effect of the change in pressure in the first chamber on the relatively rigid wall portion.
means connecting the second hollow chamber to the pressure-changing means for changing the pressure in the second chamber when it changes the pressure in the first hollow chamber, and
a retaining profile made of relatively hard plastics or rubber material which is separate from but secured to the upper part of the frame of the door opening so as to engage with the relatively rigid wall portion in its raised position and thus tend to prevent outward movement of the top edge of the door.

7. Retaining means according 6, including means for changing the pressure within the first and second hollow chambers in response to operation to a locking control for the door.

8. Retaining means for retaining at least a top edge of a vehicle door in its frame, the vehicle door carrying in its upper part a vertically slidable window glass, comprising
a strip made of plastics or rubber material running along and attached to at least the top edge of the door and defining a hollow chamber having a relatively flexible wall portion and a relatively rigid wall portion, such that an increase in pressure within the hollow chamber hinges the relatively rigid portion upwardly with respect to the top edge of the door to a raised position and the reduction in the said pressure hinges the relatively rigid portion downwardly with respect to the top edge of the door away from the raised position.
pressure-changing means connected to the hollow chamber for increasing and decreasing the pressure therewithin.
a retaining profile made of relatively hard plastics or rubber material which is separate from but secured to the upper part of the frame of the door opening so as to engage with the relatively rigid wall portion in its raised position and thus to tend to prevent outward movement of the top edge of the door, the strip defining a lip engaging the outside of a top edge of the window glass, the lip being so positioned on the strip and connected to the relatively rigid wall portion that the said change in pressure in the said hollow chamber which hinges the relatively rigid wall portion upwardly forces the lip more firmly into contact with the window glass.

9. Retaining means for retaining at least a top edge of a vehicle door in its frame, the vehicle door carrying in its upper part a vertically slidable window glass, comprising
a strip made of plastics or rubber material running along and attached to at lest the top edge of the door and defining a first hollow chamber having a relatively flexible wall portion and a relatively rigid wall portion, such that an increase in pressure within the hollow chamber hinges the relatively rigid portion upwardly with respect to the top edge of the door to a raised position and a reduction in the said pressure hinges the relatively rigid portion downwardly with respect to the top edge of the door away from the raised position.
pressure-changing means connected to the first hollow chamber for increasing and decreasing the pressure therewithin.
a retaining profile made of relatively hard plastics or rubber material which is separate from but secured to the upper part of the frame of the door opening so as to engage with the relatively rigid wall portion in its raised position and thus to tend to prevent outward movement of the top edge of the door.
a further hollow camber formed in the strip and defined at least in part by a flexible wall portion which is moved into sealing contact with the inner surface of the window glass in response to an increase in pressure in the further chamber and is moved out of such sealing contact in response to a reduction in the said pressure, and
means connecting the further hollow chamber to the pressure-changing means for increasing and decreasing the pressure in the further hollow chamber.

10. Retaining means according to claim 9, including a window operating mechanism carried by the door and means linking the window operating mechanism to the pressure-changing means so as to cause change of the pressure in the said further chamber in response to operation of the window operating mechanism.

11. Retaining means for retaining at least a top edge of a vehicle door in its frame, the vehicle door carrying in its upper part a vertically slidable window glass, comprising
a strip made of plastics or rubber material running along and attached to at least the top edge of the door and defining a hollow chamber having a relatively flexible wall portion and a relatively rigid wall portion, such that an increase in pressure within the hollow chamber hinges the relatively rigid portion upwardly wit respect to the top edge of the door to a raised position and a reduction in the said pressure hinges the relatively rigid portion downwardly with respect o the top edge of the door away from the raised position.
pressure-changing means connected to the hollow chamber for increasing and decreasing the pressure therewithin.

a retaining profile made of relatively hard plastics or rubber material which is separate from but secured to the upper part of the frame so as to engage with the relatively rigid wall portion in its raised position and thus to tend to prevent outward movement of the top edge means linking the pressure-changing means with the locking control so as to cause the pressure-changing means to change the pressure within the hollow chamber in response to operation of the locking control for the door.

* * * * *